US008975776B2

(12) United States Patent
Gunther et al.

(10) Patent No.: US 8,975,776 B2

(45) Date of Patent: Mar. 10, 2015

(54) FAST START-UP VOLTAGE REGULATOR

(75) Inventors: Andre Gunther, San Jose, CA (US); Kevin Mahooti, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 809 days.

(21) Appl. No.: 13/198,244

(22) Filed: Aug. 4, 2011

(65) Prior Publication Data

US 2013/0033104 A1 Feb. 7, 2013

(51) Int. Cl.
*H02J 3/14* (2006.01)
*G05F 1/56* (2006.01)

(52) U.S. Cl.
CPC ........................................ *G05F 1/56* (2013.01)
USPC ........................................................... 307/31

(58) Field of Classification Search
USPC ........................................................... 307/31
See application file for complete search history.

(56) References Cited

U.S. PATENT DOCUMENTS 6,114,843 A * 9/2000 Olah .............................. 323/280
6,201,374 B1 * 3/2001 Ater et al. ..................... 323/267
6,894,553 B2 5/2005 Hulfachor et al.
6,982,591 B2 1/2006 Abadeer et al.
7,199,565 B1 4/2007 Demolli
2003/0006650 A1 * 1/2003 Tang et al. ...................... 307/43
2006/0202741 A1 * 9/2006 Tran et al. ...................... 327/536
2009/0302815 A1 * 12/2009 Tanzawa ........................ 323/282
2012/0169305 A1 * 7/2012 Kwon et al. .................. 323/268
2012/0229202 A1 * 9/2012 Nikolov et al. ............... 327/564

FOREIGN PATENT DOCUMENTS

CN 101421683 A 4/2009
CN 201917840 U 8/2011

OTHER PUBLICATIONS

Office Action from Foreign Counterpart CN201210273611.4 (Dec. 27, 2013).

* cited by examiner

*Primary Examiner* — Jared Fureman
*Assistant Examiner* — Duc M Pham

(57) ABSTRACT

A system for power regulation is provided. The system includes a plurality of regulator stages and a voltage boost circuit configured to provide a source voltage to a difference amplifier of each regulator stage. The difference amplifier of each regulator stage is configured to compare a feedback voltage to an output voltage of a reference generation circuit. Each regulator stage includes a plurality of output transistors driven by an output of the difference amplifier. The system includes a start-up circuit arranged and configured to power the voltage boost circuit the reference generation circuit while operation in a start up mode.

20 Claims, 8 Drawing Sheets

FAST START-UP VOLTAGE REGULATOR

Voltage regulators are often used in electronic devices to generate a stable output voltage from a varying power supply. The current load of a device may change dynamically during operation. This change may cause fluctuations in the output voltage, which may adversely affect operation of the device. A voltage regulator adjusts supplied power according to changes in the load in order to maintain a stable voltage.

Many modern integrated circuits (IC) include a power distribution network having multiple power pins to deliver the required current to the high-speed logic circuits. Distributing the power pins around the IC package may help avoid current crowding and/or large voltage drops in the power distribution network. The resulting power distribution network is more homogeneous, guaranteeing logic performance independent of location on the IC die. Regulator architecture is often scalable to accommodate different chips with different numbers of power supply pins.

Integrated circuits often use on-chip power regulators to convert power supplied by external supplies to meet internal requirements and/or to enable them to dynamically adjust on-chip voltage to reduce power consumption. However, on-chip voltage regulators require a certain time period to start-up before a regulated voltage can be generated. In a system that powers on for a brief time and then goes back to sleep, this start up time becomes an important component in the total power consumption of the electrical system. In some applications, the start-up time dictates whether the chip can power down fully, or must remain powered on in order to respond quickly to interrupts or other events.

One or more embodiments may address one or more of the above issues.

In one embodiment, a system for power regulation is provided. The system includes a reference generation circuit configured to generate a reference voltage and at least one reference current, and a plurality of regulator stages configured to generate a respective regulated output voltage at a respective output node. Each regulator stage includes a difference amplifier and a plurality of output transistors. The difference amplifier has a first input coupled to receive the reference voltage and a respective second input coupled to receive a feedback voltage that is proportional to the respective regulated output voltage. The plurality of output transistors, each have an input driven by a signal output from the difference amplifier and are configured to drive at least on regulated output voltage at the output node in response to a signal output from the difference amplifier. The system includes a start-up circuit configured to generate second and third source voltages from a first source voltage while operating in a start-up mode. The system includes a voltage boost circuit, configured to generate a fourth source voltage from the second source voltage. The fourth source voltage is coupled to a respective power supply voltage input of each of the difference amplifiers. While operating in the startup mode, the voltage boost circuit is powered using the second source voltage and the reference generation circuit is powered using the third source voltage.

In another embodiment, an integrated circuit (IC) is provided. The IC includes a power distribution network and a master power regulator circuit coupled to the power distribution network. The master power regulator includes a circuit configured to generate a reference voltage, at least one output stage, and a respective startup circuit. The output stages are each arranged and configured to generate one or more regulated output voltages from the reference voltage. The startup circuit is arranged and configured to, while operating in a startup mode, generate one or more auxiliary source voltages from a first source voltage and provide power to the reference generation circuit and the at least one output stage using the one or more auxiliary source voltages. The IC includes at least one active slave power regulator circuit and at least one passive slave power regulator circuit having respective outputs coupled to the power distribution network.

In yet another embodiment, a method for power regulation is provided. A reference voltage and at least one reference current are generated. At least one regulated output voltage is generated at an output nodes by: generating a feedback voltage that is proportional to the regulated output voltage; generating a control signal according to a difference between the feedback voltage and the regulated output voltage using a difference amplifier; and operating a plurality of output transistors using the control signal. While operating in a start-up mode, second and third source voltages are generated from a first voltage source. The reference generation circuit is powered using the fourth source voltage. A fourth source voltage is generated from the second source voltage and is used to power the difference amplifier.

The above discussion is not intended to describe each embodiment or every implementation. The figures and following description also exemplify various embodiments.

Various example embodiments may be more completely understood in consideration of the following detailed description in connection with the accompanying drawings, in which.

Figure 1:
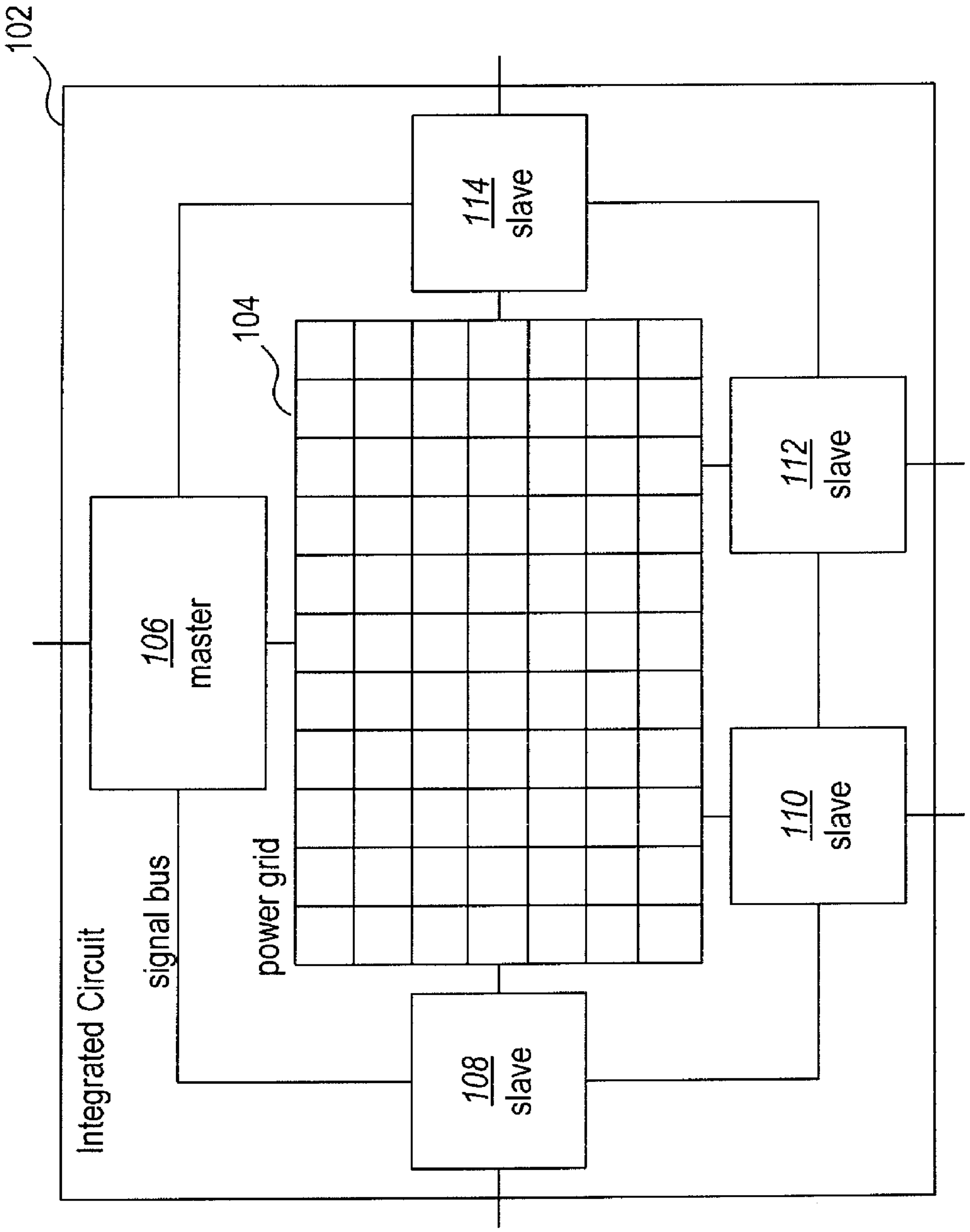
FIG. 1 shows a circuit diagram of a distributed system for power regulation.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

The disclosed embodiments are believed to be applicable to a variety of different types of processes, devices, and arrangements for use with various regulator circuits. While the embodiments are not necessarily so limited, various aspects of the disclosure may be appreciated through a discussion of examples using this context.

In accordance with one or more example embodiments, a power regulation system includes a master power regulator and a plurality of slave regulator circuits that are controlled by the master power regulator. The master power regulator includes voltage boost circuit that provides a second source voltage to one or more regulator stages, which generate a regulated voltage output using a reference voltage produced at a reference generation circuit. The master power regulator includes a startup circuit that powers the voltage boost circuit and the reference generation circuit during startup of the power regulation system.

In one or more embodiments the startup circuit is implemented using a fast reference generator paired with a shunt regulator. The reference generator implements two reference generation sub-circuits. A first one of the reference generator sub-circuits is configured to quickly generate a reference current. A second one of the reference generation sub-circuits generates a reference current that is more accurate in comparison to the first reference generation sub-circuit. The reference generator circuit is configured to utilize the first reference generation sub-circuit at startup of the regulator and switch to the second reference generator sub-circuit after startup is complete.

In one or more implementations, the plurality of slave regulators includes at least one passive slave regulator. The passive slave regulator includes one or more regulator stages that generate a regulated voltage output using the second source voltage and reference voltage generated by the master regulator.

In accordance with other implementations, the plurality of slave regulators includes at least one active slave regulator that includes a respective startup circuit and voltage boost circuit. The active slave regulator includes one or more regulator stages that generate a regulated voltage output using a third source voltage generated by the voltage boost circuit of the active slave regulator, and a reference voltage generated by the master regulator. The startup circuit of the active slave regulator powers the voltage boost circuit of the active slave generator during startup of the power regulation system.

FIG. 1 depicts a distributed system for power regulation, in accordance with another example embodiment. The illustrated system includes a master power regulator 106 that controls a plurality of slave power regulators located at various positions along a power grid network 104. In this example, five regulators (one master power regulator 106 and four slave power regulators 108, 110, 112, and 114) connect to five external power supply pins. However, the distributed system may include any number of slave regulators. Depending on the current capability of the regulators and the pins, it is also possible to use multiple regulators per pin, or to use multiple pins per regulator. Furthermore, it is also possible to drive several independent power supplies, each with an arbitrary number of regulators driving it. This can be useful to create separate power islands that can power cycle individually and that can have different supply voltages. Each regulator can have one or more output pins that connect to one or more locations of a power distribution network 104, and can be grouped into banks with the same output voltage.

Figure 2:
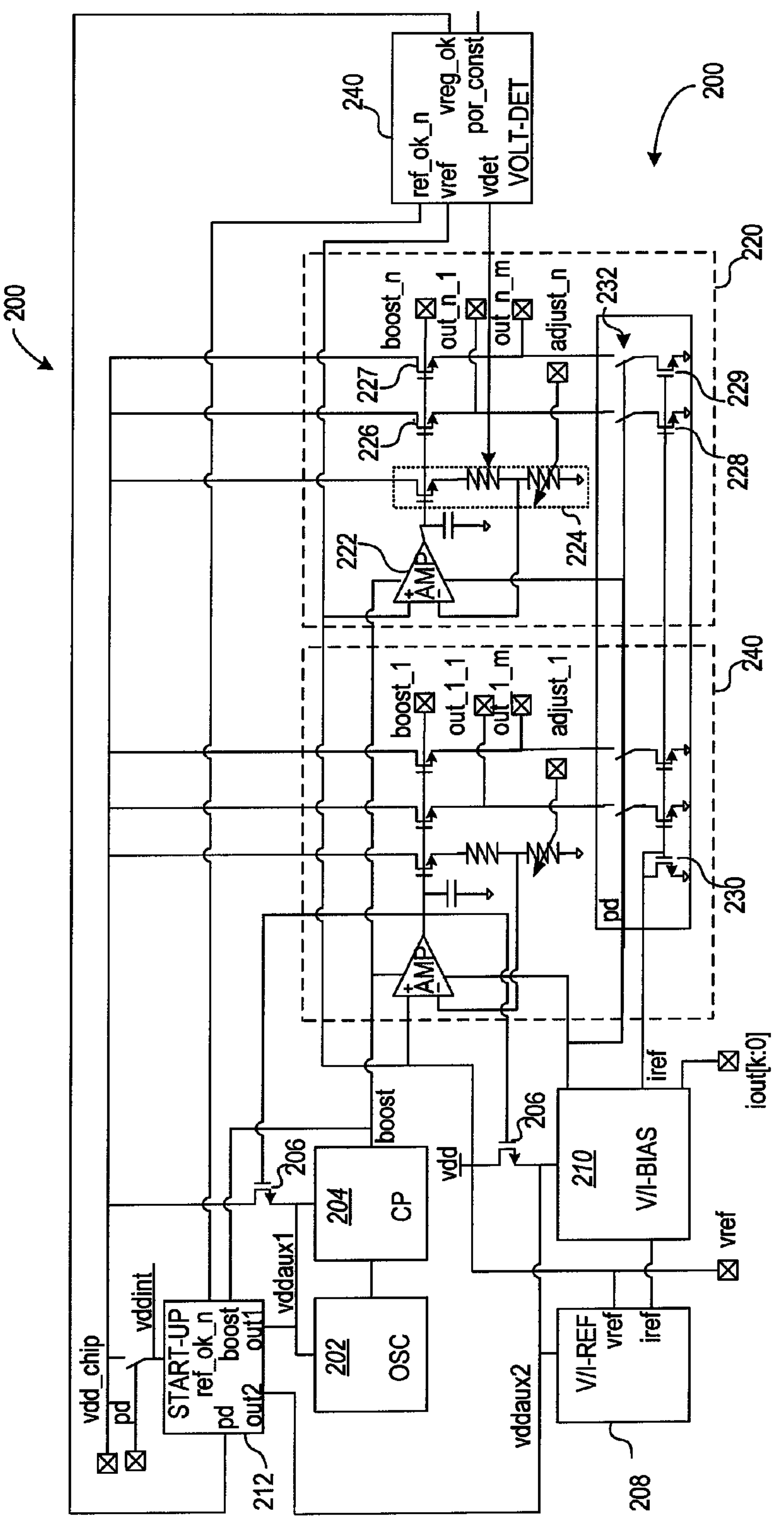
FIG. 2 shows a circuit diagram of a master power regulator with fast start up circuitry that may be used in a distributed system for power regulation.

FIG. 2 shows a master power regulator 200, in accordance with another example embodiment. The master power regulator 200 may, for example, be used to implement the master power regulator 106 depicted in FIG. 1. The master power regulator 200 includes a reference generation circuit 208 that generates a reference voltage and a reference current, and plurality of regulator stages including stages 220 and 240. Each regulator stage includes a difference amplifier 222 having a first input coupled to receive the reference voltage and a respective second input coupled to receive a feedback voltage that is proportional to a regulated output voltage generated by the regulator stage. The regulator stage also includes a plurality of output transistors including, e.g. transistors 226 and 227, that are each arranged in a source follower configuration with respective biasing transistor 228 and 229. Each biasing transistor forms a respective current mirror with transistor 230 to bias the corresponding transistor 226 according to a reference current iref output from a biasing circuit 210. Each output transistor has an input driven by a signal output from the difference amplifier and is configured to drive a regulated output voltage of the regulator stage in response to a signal output from the difference amplifier. The feedback voltage, input to the difference amplifier, is provided by a replica output stage 224. The feedback voltage of each regulator stage may be independently adjusted with adjust signal (adjust_1-adjust_n) and may be digitally controlled to regulate the respective regulated output voltage of each regulator state and may be configured to cause the regulator stages 220 and 221 produce different regulated output voltages.

The master power regulator 200 includes a voltage boost circuit 202 and 204 that is configured to generate a second source voltage (boost) from a first source voltage (Vdd_chip). The second source voltage (boost) is use to power the difference amplifier 222 of each regulator stage to provide low dropout capability. For low supply voltages, the difference amplifier 222 has the capability to drive the gate voltage higher than the first supply voltage, fully turning on the output NMOS transistor.

In this example, the voltage boost circuit is implemented using a charge pump 204 that charges one or more energy storage elements, in response to the output of the oscillator 210, to produce the second source voltage (boost) from a first source voltage (Vdd) at a rate controlled by the oscillator.

The master power regulator 200 includes a start up circuit configured to generate a third and fourth source voltages from Vdd. While operating in the startup mode the third source voltage (vddaux1) is used to power the voltage boost circuit 202 and 204, and the fourth source voltage (vddaux2) is used to power a reference generation and the biasing circuits 208 and 210 which generate the reference voltage and biasing current used by each regulator stage 220 and 221. As described in more detail below, the startup circuit 212 has the capability to start up almost instantaneously and deliver a less accurate but sufficient supply voltage.

The output voltage of the regulator stage 220 is monitored by a voltage detector circuit 240 which is configured to determine when a stable output voltage is achieved. Once a stable out voltage is achieved, the voltage detector circuit 240 triggers the startup circuit 212 to operate turn off to reduce the power consumption. At this time, the voltage boost circuit, the reference generation circuit 208, and the biasing circuit 210 are powered by transistors 206, which provide a regulated replica voltage of the regulated output voltage.

In one of more embodiments, the output transistors 226 of each regulator stage 222 are implemented using thick gate oxide transistors. Due to this design choice, the second source voltage (boost) generated by the charge pump will not exceed the breakdown voltage of any transistor connected to the boost node, even when configured to produce the highest regulated output voltage.

For illustration, each regulator stage shown in FIG. 2 includes two output transistors 226 and 227. However, the output stages may be implemented to include any number of output transistors, which may be used to provide power for different sections of a power grid or for separate circuits. In some embodiments, the regulator stages may include additional circuitry to selectably enable or disable one or more of the output transistor. For example, transistors (e.g., 227 and 226) may be selectably connected/disconnected from Vdd_chip in response to a respective enable signal. Such connect/disconnect mechanism may be used to conserve power by eliminating leakage currents based on load currents. For example, in some applications, an enable control may be configured to enable and disable one or more of the plurality of output transistors 226 in response to large increases or decreases in load current demands connected to the corresponding regulated output voltage.

Figure 3:
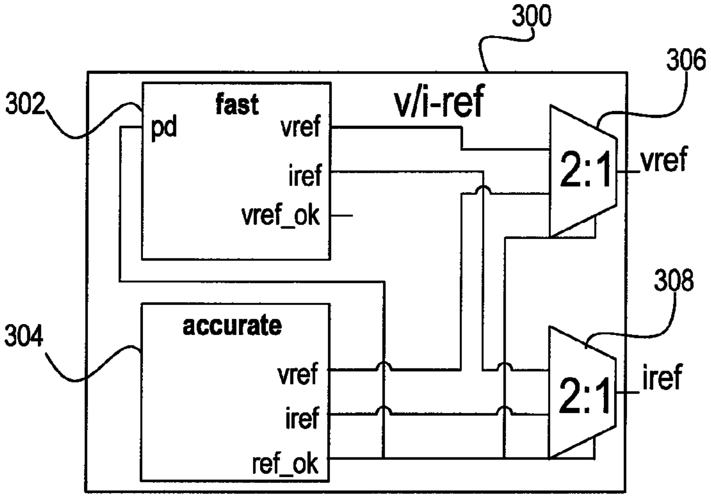
FIG. 3 shows an fast start-up reference generation circuit that may be used in accordance with one or more embodiments.

Because feedback of the difference amp 222 is provided using a replica feedback stage 224, an increase in load current on one of the output transistors 226 or 227 will not cause the regulator to increase voltage signal output from the charge pump. The net effect is reduced load regulation but also reduced peak-to-peak noise of the output voltage. This allows several output stages to be driven from the same voltage without transferring noise between output stages. This is useful to isolate noisy and power hungry loads from those that may be particularly sensitive to power supply FIG. 3 shows a reference generation circuit in accordance with one or more embodiments. The reference generation circuit 300 may, for example, be used to implement the reference generation circuit 208 shown in FIG. 2. The reference generation circuit 300 includes first and second sub-circuits 302 and 304 configured to generate reference voltages and/or currents. 304 The first sub-circuit 302 is optimized for faster startup time and may consume more power and exhibit less accuracy in comparison to the second sub-circuit 304. In contrast, the second sub-circuit 304 is optimized for temperature stability and insensitivity to process and voltage variations and may take longer to start up. Furthermore, its power consumption is very small.

The second sub-circuit has an internal circuit that detects when the reference voltage has reached closely within the final value. It contains an additional delay circuitry to ensure that it has settled to its final value. The delay circuit automatically switches the output voltage and output current, via multiplexors 306 and 308, from the lower accuracy, power hungry first sub-circuit to the lower power, second sub-circuit and turns the first sub-circuit off to conserve power.

Figure 4:
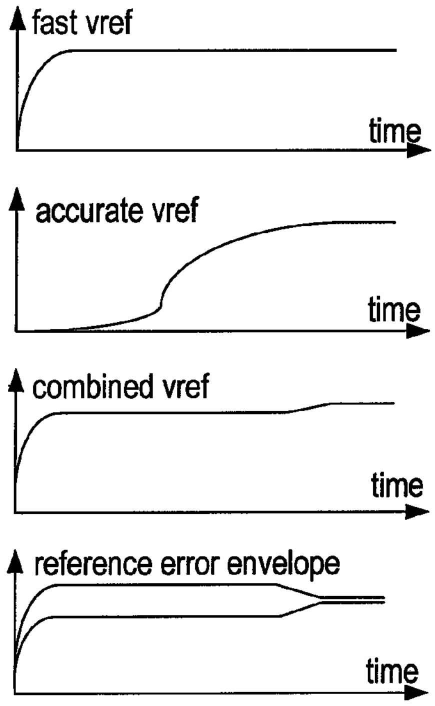
FIG. 4 illustrates the output waveforms of the first and second reference generation sub-circuits of FIG. 3, and their combination.

FIG. 4 illustrates the waveforms produced by the first sub-circuit, the waveform produced by the second sub-circuit, the combined output of the two sub-circuits, and the error envelope waveform. It is recognized that actual waveforms of the circuits may vary from those depicted. The waveforms may represent output voltage or output current.

The fast reference waveform (fast vref) generated by the first sub-circuit 302 starts quicker than the accurate reference waveform (accurate vref) generated by the second sub-circuit 304. The third waveform illustrates the combination of the fast vref and accurate vref waveforms (combined vref), which switches to the accurate vref only after the accurate vref has completely started up. Therefore, high output accuracy takes longer to achieve. Until then, the voltage/current will have a greater error. This is shown in the reference error envelope. A greater error means that the regulator is not working at its peak performance. However, this is not necessary during startup, as the high-speed clock multipliers (PLL, DLL) will take longer than this reference will take to achieve highest performance. The output voltage of the regulator will be very close to the final value though, and the chip can operate almost at maximum speed.

Figure 5:
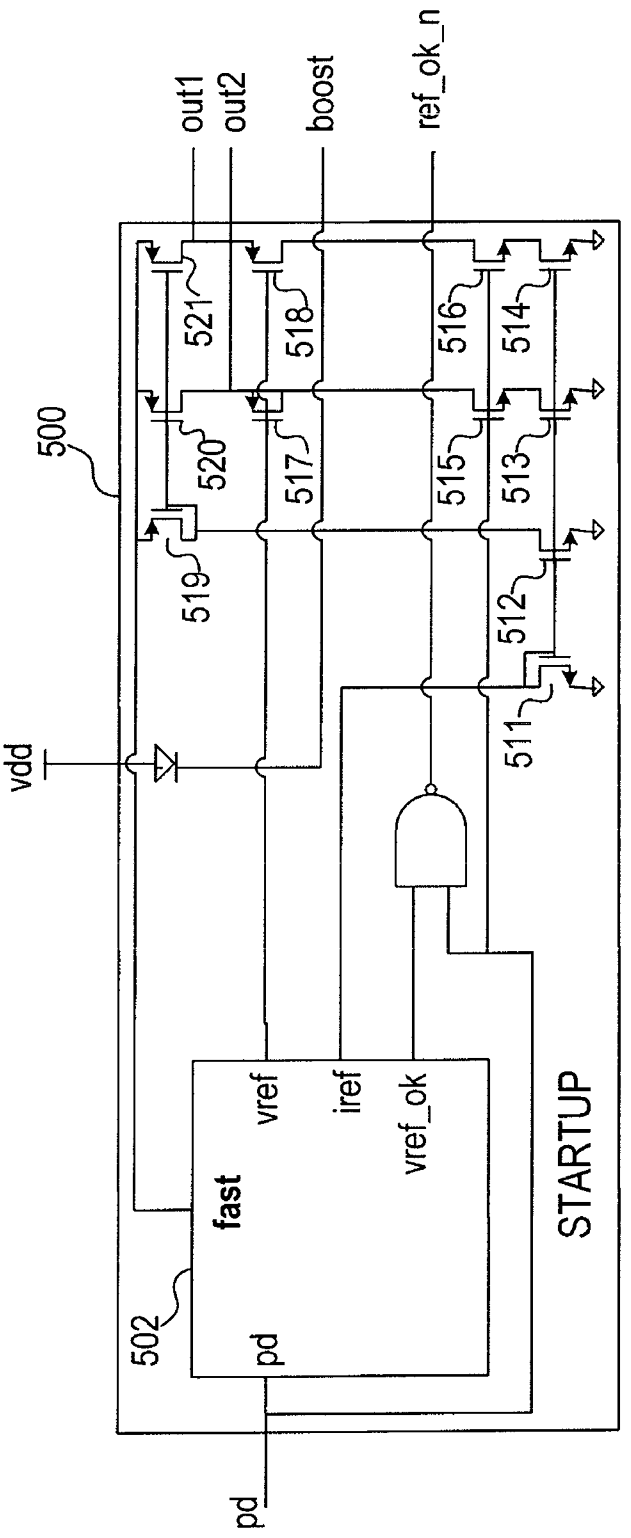
FIG. 5 shows a startup circuit that may be used in accordance with one or more embodiments.

FIG. 5 shows a startup circuit in accordance with one or more embodiments. The startup circuit 500 may, for example, be used to implement startup circuit 212 shown in FIG. 2. As discussed above, the startup circuit generates third and fourth source voltages (Vddaux1 and Vddaux2) from the first source voltage (Vdd) which are used to power to the power the voltage boost circuit and reference generation circuit and bias generator circuit during the initial phase of the power up sequence.

This block contains a reference generation circuit 502 similar to the first sub-circuit 302 shown in FIG. 3. This reference powers a simple shunt regulator. Due to the simple feed-forward control mechanism of the shunt regulator, it only delays the startup procedure due to its internal node parasitic, which is negligible in this case. It can therefore provide a supply voltage almost instantaneously.

Transistors 511 and 512, and transistors 519, 520, and 521, mirror and amply the reference current (iref). Transistors 520 and 521 are thus current sources whose output current is several times the reference current. These current are designed to be larger than the maximum required load current connected at the outputs (out1) and (out2).

The transistors 513 and 514 and the transistors 517 and 518 are the load and clamp of the shunt regulator. The loads draw a certain amount of current. Since the transistors 520 and 521 can deliver more current from source, the output voltage rises. If the output voltage rises above the reference voltage vref+ threshold voltage of the PMOS devices 517 and 518 respectively, 517 and 518 will become conductive and sink the additional current via the current loads 513 and 514.

This circuit is very fast and can be used to assist in the startup, but may be power inefficient. In one or more embodiments, the startup circuit 500 is configured to power down once the regulator outputs start up. While powered down, transistors 515 and 516 disable the parasitic current drain on the internal supplies and cut off current to transistors 520 and 521. In some implementations, the reference generation circuit 5302 included in the start-up circuit 500 may also be disabled.

Figure 6:
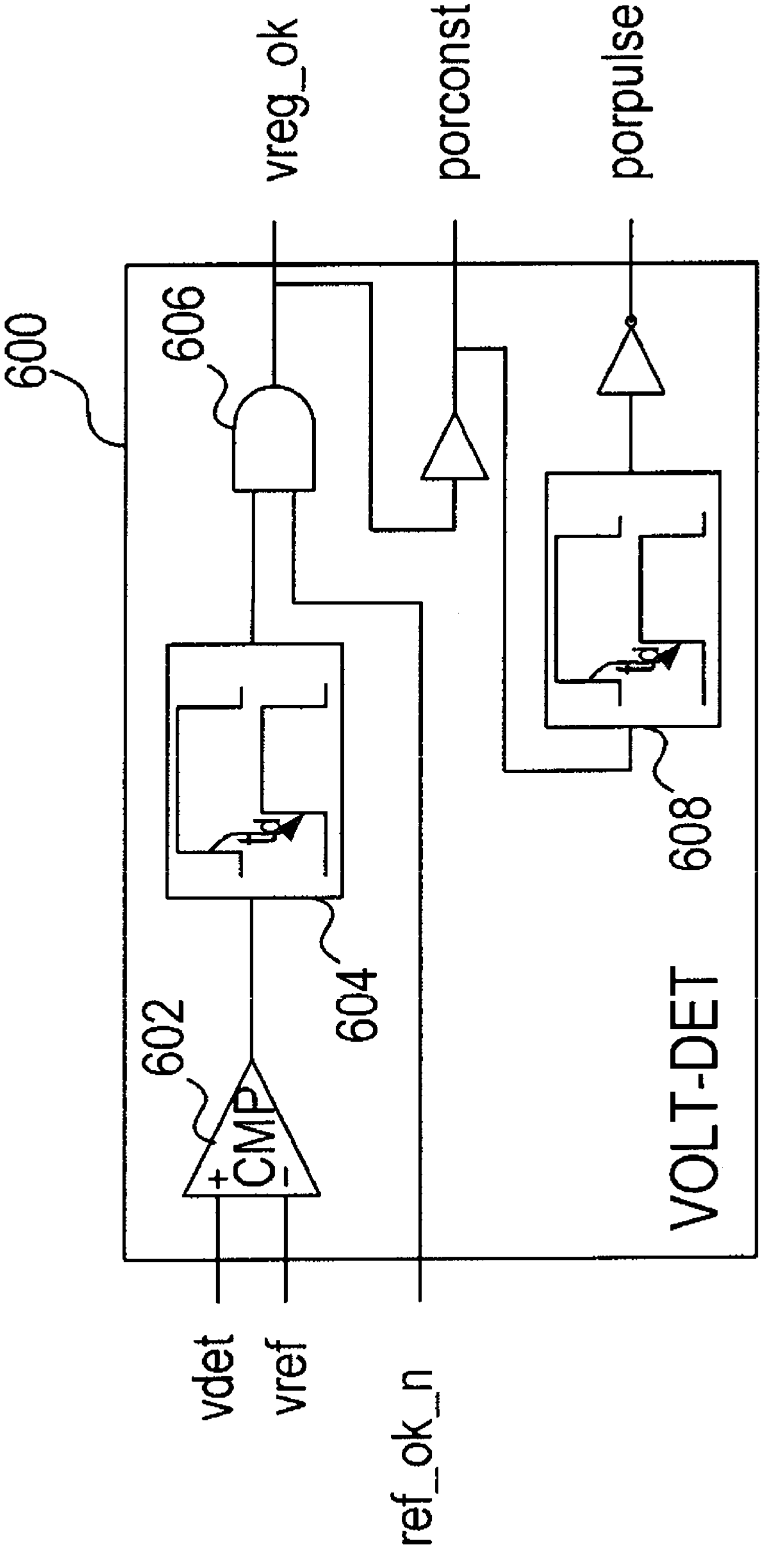
FIG. 6 shows a voltage detector circuit that may be used in accordance with one or more embodiments.

FIG. 6 shows a voltage detector circuit in accordance with one or more embodiments. The voltage detector circuit 600 may, for example, be used to implement voltage detector 240 shown in FIG. 2. The voltage detector circuit 600 senses the state of the output voltage and generates a signal (vreg_ok) indicating that the reference voltage (vdet) generated by the output stage 220 has reached a target reference voltage (vref). The vreg_ok signal causes the startup circuit 212 to turn off. As a result, the startup circuit 212 stops producing the third and fourth supply voltages and may power down. In some applications the Vreg_ok signal may be used to communicate status of the power regulator to other circuits. One example application may utilize the combined use of this regulator with a low power regulator that will keep the state of the internal logic while the high current regulator turns off. Sensing when the regulator has started back up will give the digital core an indication when it is save to switch to higher speeds of operation, without corrupting the supply voltage.

The voltage detector operates by comparing the output voltage (vdet) with the reference voltage (vref) from the reference generation circuit. Vdet is derived by a tap into the feedback network at a slightly different point than the controlling amplifier 222 of the regulator stage. This causes the comparator 602 of the voltage detector to trip slightly ahead of time, before the output voltage reaches its final value. This earlier trip point helps to avoid oscillations of the reg_ok signal and to account for mismatch between the comparator 602 and the amplifier 222. In order to compensate for this, the voltage detector 600 includes a delay generator 604. This delay generator 604 will delay the comparator trip long enough to ensure that it has settled.

To prevent false trip when the internal references initially start up, the ref_ok_n signal from the startup block 212 is used to gate the output of the comparator using and gate 606.

During the initial startup, both comparator inputs are low and the output of the comparator 602 is undetermined. This gating will ensure proper levels before the comparator trip.

In one of more implementations, the information of the voltage detector block may include circuitry to generate a power on reset (POR) signal (porconst) that may be used to signal logic of an integrated circuit powered by the regulator that a regulated voltage is achieved. The voltage detector trip point automatically changes with the programmed output voltage setting. As a result, the trip point of the POR automatically adjusts as well. A second delay generator 608 may also be included to generate a POR pulse signal (porpulse).

Figure 7:
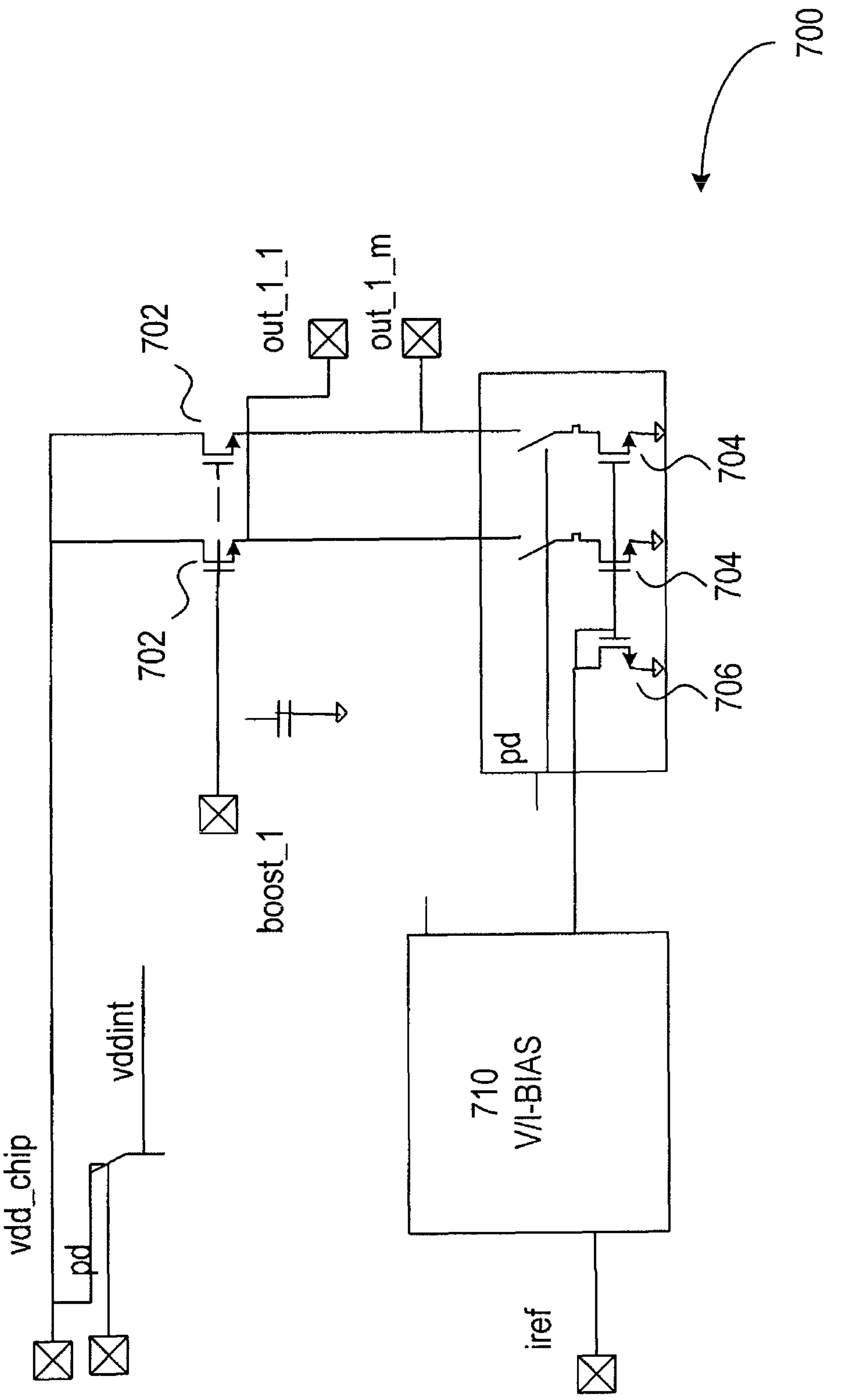
FIG. 7 shows a passive slave regulator circuit that may be used in a distributed system for power regulation.

FIG. 7 shows a passive slave regulator circuit in accordance with one or more embodiments. The passive slave regulator circuit 700 may, for example, be used to implement one or more of the slave regulators 108 shown in FIG. 1. This passive slave regulator 700 implements one regulator stage that includes a plurality of output transistors 702 respectively arranged in a source follower configuration with biasing transistor 704. Each biasing transistor 704 forms a respective current mirror with transistor 706 to bias the corresponding transistor 704 according to a reference current output from a respective biasing circuit 710.

The internal voltage of the biasing circuit 710 is supplied from the master power regulator. The reference current and the boost node connection also come from the master power regulator. The passive slave regulator 700 can be thought of an extension of the output stage of the master power regulator 200 that is located at a different area of the IC. Since the passive slave regulator 700 increases the capacitive loading on the control amplifiers, the startup performance of the power supply will slowly deteriorate as a larger number of passive regulators are connected and enabled. However, for many applications, this may not be an issue. Passive slave regulators 700 can be used to create separate power islands and can be shut down individually as needed to meet the requirements of a particular application or to reduce leakage power of one logic circuits of the IC when inactive.

Figure 8:
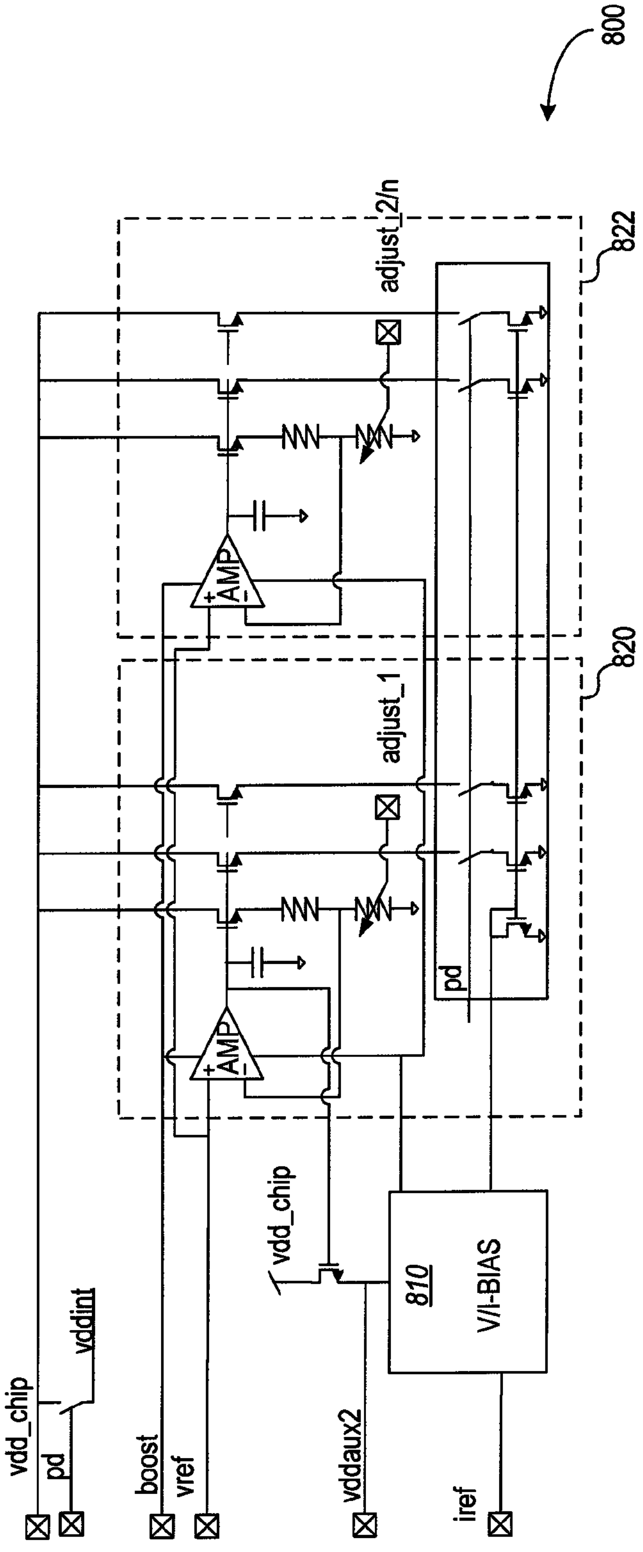
FIG. 8 shows another passive slave regulator circuit that may be used in a distributed system for power regulation.

FIG. 8 shows another passive slave regulator circuit 800 in accordance with another example embodiment. The passive slave regulator circuit 800 may, for example, be used to implement one or more of the slave regulators 108 shown in FIG. 1. The passive slave regulator includes a bias generator 810 and a plurality of regulator stages including stages 820 and 822, which may operate with local feedback in similar manner to bias generator 210 and regulator stages 220 and 221 included in the master power regulator 200 shown in FIG. 2. The internal voltage of the bias generator is supplied from the master power regulator. The reference current and the boost node connection also come from the master power regulator.

As a larger number of passive slave regulators 800 are added, start-up performance is reduced, which is limited by the loading to the charge pump. However, unlike the regulator of FIG. 7, the regulator stages may be independently adjusted to produce different output voltages as described with reference to FIG. 2.

Figure 9:
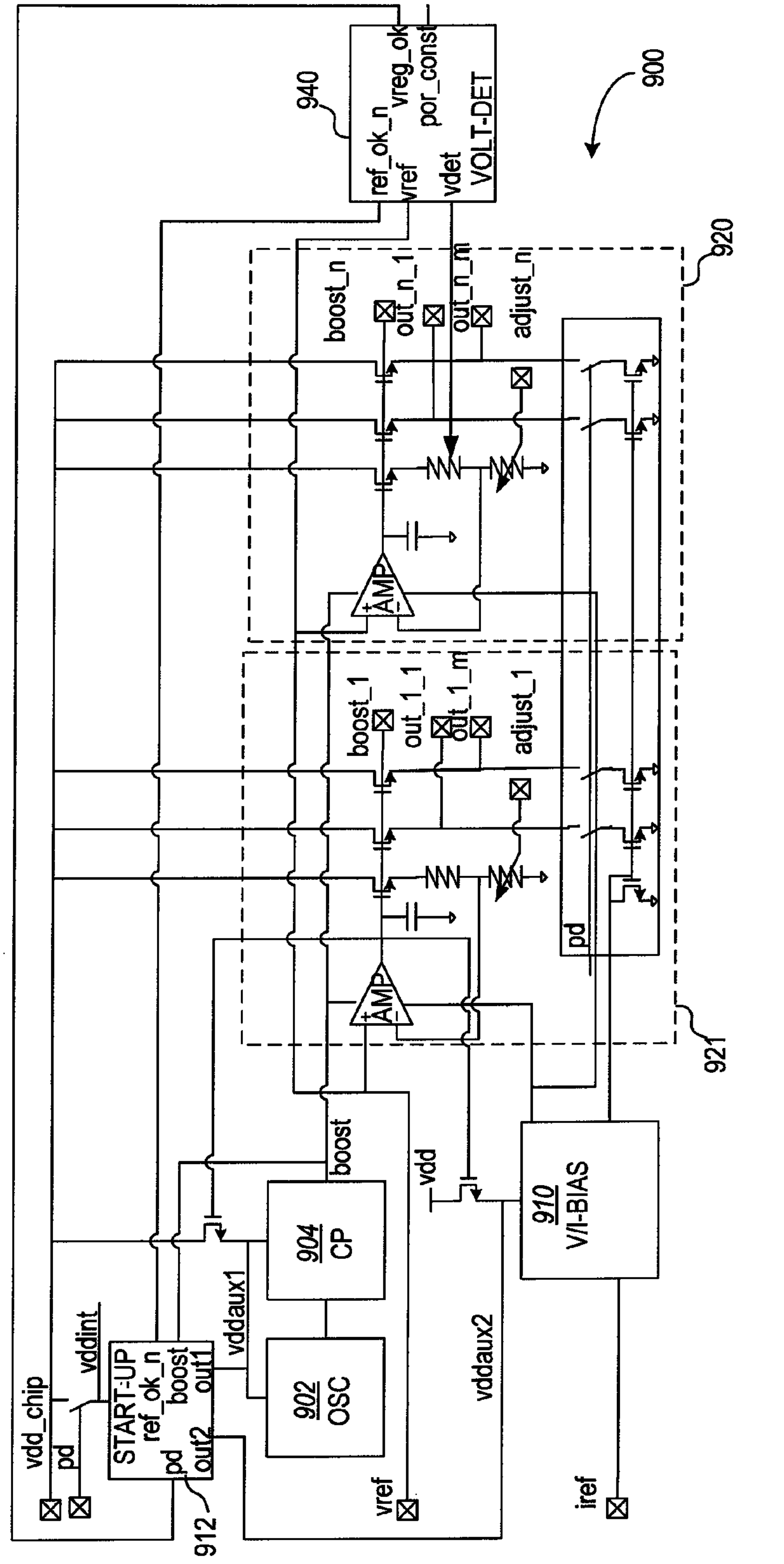
FIG. 9 shows an active slave regulator circuit that may be used in a distributed system for power regulation.

FIG. 9 shows an active slave regulator circuit 900, in accordance with another example embodiment. The active slave regulator circuit 900 may, for example, be used to implement one or more of the slave regulators 108 shown in FIG. 1. The active slave regulator 900 includes plurality of regulator stages 920 and 921 which may operate with local feedback in similar manner to regulator stages 220 and 221 of the master power regulator 200 shown in FIG. 2. The active slave regulator 900 also includes a respective voltage boost circuit 902 and 904, a startup circuit 912, a bias circuit 910, and voltage detector circuit 940 configured to operate in the manner described with circuits 202, 204, 210, 212, and 240 shown in FIG. 2. The voltage reference for the feedback amplifiers and for the voltage detector 940 of the active slave regulator 900 comes from the master power regulator 200 and thus is controlled by the master power regulator.

The active slave regulator is thus very similar to the master power regulator, but it does not need to have a reference generation circuit. The reference generation circuit consumes a significant portion of the regulator die size, due to the accurate reference block. The other significant portion is the output transistor and gate capacitor. Using an active slave regulator helps to keep the startup performance independent of the number of slave regulators in the system. It also helps to reduce electromagnetic interference (EMI) that, since the inherent mismatch between oscillators of different reference generation circuits will result in a broader spectrum for the noise.

The active slave regulator may require more power than the passive slave regulators but allows regulated output voltages to be adjusted independent of the master power regulator. Each of the slaves can be enabled or disabled individually to suit power consumption and regulation requirements of a particular application and may be used to drive individual power domains or operate in parallel connection with the main regulator.

Based upon the above discussion and illustrations, those skilled in the art will readily recognize that various modifications and changes may be made without strictly following the exemplary embodiments and applications illustrated and described herein. Furthermore, various features of the different embodiments may be implemented in various combinations. Such modifications do not depart from the true spirit and scope of the present disclosure, including that set forth in the following claims.

What is claimed is:

1. A system for power regulation, the system comprising:

a reference generation circuit configured and arranged to generate a reference voltage and at least one reference current;

a plurality of regulator stages configured and arranged to generate a respective regulated output voltage at a respective output node, each regulator stage including:

a difference amplifier having a first input coupled to receive the reference voltage and a respective second input coupled to receive a feedback voltage that is proportional to the respective regulated output voltage; and a plurality of output transistors, each output transistor having an input driven by a signal output from the difference amplifier and configured and arranged to drive the regulated output voltage at the output node in response to a signal output from the difference amplifier;

a voltage boost circuit, configured and arranged to generate a second source voltage from a first source voltage, the second source voltage coupled to a respective source voltage input of each of the difference amplifiers;

a start-up circuit arranged and configured to, while operating in a start-up mode, generate second and third source voltages from a first voltage source, and power the reference generation circuit using the fourth source voltage; and a voltage boost circuit, configured and arranged to generate a fourth source voltage from the second source voltage, the fourth source voltage coupled to a respective source voltage input of each of the difference amplifiers.

2. The system of claim 1, further comprising a plurality of slave regulator circuits, each slave regulator circuit being arranged and configured to generate at least one respective regulated voltage from the reference voltage.

3. The system of claim 2, wherein the plurality of slave circuits includes:

at least one active slave regulator circuit; and at least one passive slave regulator circuit.

4. The system of claim 2, wherein the at least one active slave regulator and at least one passive slave regulator are coupled to different locations of a power grid network from each other and from the plurality of regulator stages.

5. The system of claim 4, wherein the at least one active slave regulator includes:

a second start-up circuit configured and arranged to, generate a fifth source voltage from the first source voltage while operating in a start-up mode;

a second voltage boost circuit, configured and arranged to generate a sixth source voltage from the fifth source voltage; and at least one regulator stage configured and arranged to generate a regulated output voltage at a respective output node, each of the at least one regulator stages having:

a power supply voltage terminal coupled to receive the sixth source voltage from the second voltage boost circuit; and an input coupled to receive the reference voltage generated by the reference generation circuit.

6. The system of claim 4, wherein the at least one passive slave regulator includes:

at least one regulator stage configured and arranged to generate a regulated output voltage at a respective output node, each of the at least one regulator stages having:

a power supply source voltage terminal coupled to receive the fourth source voltage from the first mentioned voltage boost circuit; and an input coupled to receive the reference voltage generated by the reference generation circuit.

7. The system of claim 1, wherein the start-up circuit is configured to:

operate in the start-up mode in response to the reference voltage being unstable; and exit the start-up mode in response to the reference voltage being stable.

8. The system of claim 1, wherein the start-up circuit is configured to stop generating the third and fourth source voltages in response to the output voltage reaching a target output voltage.

9. The system of claim 1, wherein the voltage boost circuit includes:

an oscillator; and a charge pump having a control input coupled to an output of the oscillator, the charge pump being configured and arranged to generate the fourth source voltage in response to an output of the oscillator.

10. The system of claim 1, wherein each of the plurality of regulator stages includes:

a replica output regulator, configured to produce the feedback voltage, the replica output regulator having an input driven by the output of the difference amplifier.

11. The system of claim 1, wherein each of the plurality of output transistors of each plurality of regulator stages is an NMOS transistor arranged in a source follower configuration.

12. The system of claim 1, wherein the reference generation circuit includes:

a first reference generation sub-circuit configured to provide a stable reference voltage within a first tolerance in a first startup time period; and a second reference generation sub-circuit configured to provide a stable reference voltage within a second tolerance in a second startup time period, the first time period being less than the second time period and the second tolerance being less than the first tolerance.

13. The system of claim 12, wherein the reference generation circuit is configured to output a voltage from the second reference generation sub-circuit as the reference voltage during the first startup time period.

14. The system of claim 13, wherein the reference generation circuit is configured to output a voltage from the second reference generation sub-circuit as the reference voltage in response to the second reference generation sub-circuit providing a steady reference voltage.

15. The system of claim 14, wherein the reference generation circuit is configured to power down the first reference generation sub-circuit in response to the second reference generation sub-circuit providing a steady reference voltage.

16. An integrated circuit, comprising:

a power distribution network;

a master power regulator circuit coupled to the power distribution network, the master power regulator including:

a reference generation circuit configured to generate a reference voltage;

at least one output stage arranged and configured to generate one or more regulated output voltages from the reference voltage;

a startup circuit arranged and configured to, while operating in a startup mode:

generate one or more auxiliary source voltages from a first source voltage; and provide power to the reference generation circuit and the at least one output stage using the one or more auxiliary source voltages;

at least one active slave power regulator circuit having an output coupled to the power distribution network; and at least one passive slave power regulator circuit having an output coupled to the power distribution circuit.

17. The integrated circuit of claim 16, further comprising at least one load coupled to the power distribution network; and wherein the master power regulator includes signaling circuit arranged and configured to:

generate a power-on-reset signal in response to the reference voltage reaching a target reference voltage, and provide the power-on-reset signal to the at least one load.

18. The integrated circuit of claim 16, wherein the at least one active slave power regulator circuit includes:

at least one output stage arranged and configured to generate a regulated output voltage from the reference voltage generated by the master power regulator; and a startup circuit arranged and configured to, while operating in the startup mode:

generate at least one auxiliary source voltage from a first source voltage; and provide power to the at least one output stage using the at least one auxiliary source voltage.

19. The integrated circuit of claim 16, wherein the at least one passive slave power regulator circuit includes:

at least one output stage arranged and configured to generate a regulated output voltage from the reference voltage generated by the master power regulator, the startup circuit of the master regulator being further arranged and configured to power the one or more output stages while operating in the startup mode.

20. A method for power regulation, comprising:

generating a reference voltage and at least one reference current;

generating at least one regulated output voltage at an output nodes by performing operations including:

generating a feedback voltage that is proportional to the regulated output voltage;

generating a control signal according to a difference between the feedback voltage and the regulated output voltage using a difference amplifier; and operating a plurality of output transistors using the control signal;

while operating in a start-up mode, generating second and third source voltages from a first voltage source, and powering the reference generation circuit using the fourth source voltage; and generating a fourth source voltage from the second source voltage and powering the difference amplifier using the fourth source voltage.

* * * * *